United States Patent
Khan et al.

(10) Patent No.: US 10,635,772 B1
(45) Date of Patent: *Apr. 28, 2020

(54) METHOD AND APPARATUS FOR PERFORMING FAST INCREMENTAL PHYSICAL DESIGN OPTIMIZATION

(71) Applicant: Altera Corporation, San Jose, CA (US)

(72) Inventors: Junaid Asim Khan, Mississauga (CA); Gabriel Quan, Toronto (CA); Ketan Padalia, Richmond Hill (CA); Scott James Brissenden, Toronto (CA); Ryan Fung, Mississauga (CA)

(73) Assignee: Altera Corporation, San Jose, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 15/379,747

(22) Filed: Dec. 15, 2016

Related U.S. Application Data

(63) Continuation of application No. 14/200,897, filed on Mar. 7, 2014, now Pat. No. 9,569,574.

(51) Int. Cl.
*G06F 17/50* (2006.01)

(52) U.S. Cl.
CPC ...... *G06F 17/5072* (2013.01); *G06F 17/5077* (2013.01); *G06F 2217/06* (2013.01)

(58) Field of Classification Search
CPC ........... H01L 27/0207; H01L 27/11807; H01L 23/528; H01L 2224/73265; H03K 19/17736; H03K 19/17728; H03K 19/17748; H03K 19/1778; G06F 19/22; G06F 19/24; G06F 19/28; G06F 13/16; G06F 13/4068; G06F 13/4265; G06F 17/505; G06F 17/5022; G06F 17/5045; G06F 17/5068; G06F 17/5054; G06F 11/261; G06F 17/5072; G06F 17/5081; G06F 2217/64; G06F 15/8023; G06F 2209/5017; G06F 2209/521; G06F 8/458; G06F 9/30087; G06F 9/3834; G06F 9/3851; G06F 9/4494; G06F 9/5016; G06F 9/5033; G06F 9/5038; G06F 9/52; G06F 9/522; G06F 9/526; G06F 17/5031; (Continued)

(56) References Cited

U.S. PATENT DOCUMENTS 8,028,263 B2  9/2011  Chong et al.
8,281,274 B1  10/2012  Padalia et al.
(Continued)

OTHER PUBLICATIONS

U.S. Appl. No. 14/200,897, filed Mar. 7, 2014, In Re Application of Khan, et al.

*Primary Examiner* — Binh C Tat
(74) *Attorney, Agent, or Firm* — Fletcher Yoder, P.C.

(57) ABSTRACT

A method for designing a system on a target device includes generating a first netlist for a first version of the system after performing synthesis in a first compilation. Optimizations are performed on the first version of the system during placement and routing in the first compilation resulting in a second netlist. A third netlist is generated for a second version of the system after performing synthesis in a second compilation. A hybrid netlist is generated from the first, second, and third netlists. Incremental placement and routing are performed on portions of the hybrid netlist that are new to the first compilation.

8 Claims, 11 Drawing Sheets

(58) Field of Classification Search
CPC .......... G06F 17/5077; G06F 2212/684; G06F 2217/12; G06F 2217/78; G06F 9/30014; G06F 9/5066; G06F 11/267; G06F 21/554; G06F 21/566; G06F 21/567; G06F 2217/08; G06F 2217/74; G06F 2217/84; G06F 2221/033; G06F 12/1027; G06F 16/7343; G06F 16/90344; G01R 31/31704; G01R 31/318357; G01R 31/318335; G01R 31/001
USPC .................................................. 716/118–125
See application file for complete search history.

(56) References Cited

U.S. PATENT DOCUMENTS

| | | |
|---|---|---|
| 8,296,695 B1 | 10/2012 | Chen et al. |
| 8,484,596 B1 | 7/2013 | Chen et al. |
| 8,539,418 B1 | 9/2013 | Padalia et al. |
| 8,732,634 B1 | 5/2014 | Chen et al. |
| 9,569,574 B1 * | 2/2017 | Khan .................... G06F 17/505 |
| 2001/0010090 A1 | 7/2001 | Boyle et al. |
| 2006/0225008 A1 | 10/2006 | Schleicher et al. |
| 2009/0055780 A1 * | 2/2009 | Acar ................... G06F 17/5031 716/132 |
| 2009/0307640 A1 * | 12/2009 | Chapman ............ G06F 17/5045 716/136 |
| 2010/0192111 A1 * | 7/2010 | Dsouza ............... G06F 17/5022 716/104 |
| 2012/0117301 A1 * | 5/2012 | Wingard ............. G06F 12/1027 711/6 |
| 2015/0363531 A1 * | 12/2015 | Fricke ................. G06F 17/5072 716/135 |

\* cited by examiner

METHOD AND APPARATUS FOR PERFORMING FAST INCREMENTAL PHYSICAL DESIGN OPTIMIZATION

RELATED APPLICATION

This application is a continuation application of and claims priority and benefit to U.S. application Ser. No. 14/200,897 filed on Mar. 7, 2014, entitled, "Method and Apparatus for Performing Fast Incremental Physical Design Optimization".

FIELD

Embodiments of the present invention relate to tools for designing systems on target devices. More specifically, embodiments of the present invention relate to a method and apparatus for performing fast incremental physical design optimization.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device. When designing large systems to be implemented on large target devices, EDA tools may require a large amount of time to perform these compilation procedures.

When making changes to large systems, it is typically more common for designers to modify localized portions of a design rather than making radical changes to large portions of the system. When making such localized changes, it is undesirable to have to invest a large amount of time to re-compile the entire system which would include the unmodified portions of the design. It is also undesirable to have the EDA tool process the entire system from scratch because the designer may be satisfied with the results of unmodified portions of the system and re-processing the unmodified portions may change achieved timing results unfavorably due to the heuristic nature of CAD algorithms. This may result in requiring additional design iterations to be performed to achieve timing closure which could be costly.

SUMMARY

A difference-based incremental physical design flow is used to compile a new design of a system using information from a previously compiled design of a system. A hybrid netlist is generated that includes information about optimized nodes from the previously compiled design as well as information about un-optimized, new/modified nodes that correspond to the new design. A new physical design flow is used to optimize, place, and route the new/modified logic with minimal disruption to the previously compiled design. This approach works well for engineering change orders where the new design of the system requires small or localized changes to the previously compiled design of the system. An engineering change order may include (1) changes to a logical representation of a design such as those expressed by changing hardware description language, (2) changes to a physical implementation constraint on placement, mode of a component, or routing, and/or (3) changes to an optimization objective.

According to an embodiment of the present invention, a method for designing a system on a target device includes generating a first netlist for a first version of the system after performing synthesis in a first compilation. Optimizations are performed on the first version of the system during placement and routing in the first compilation resulting in a second netlist. A third netlist is generated for a second version of the system after performing synthesis in a second compilation. A hybrid netlist is generated from the first, second, and third netlists. Incremental placement and routing are performed on portions of the hybrid netlist that are new to the first compilation.

According to an alternate embodiment of the present invention, a method for designing a system on a target device includes generating a first netlist for a first version of the system after performing synthesis in a first compilation. Optimizations are performed on the first version of the system during placement in the first compilation resulting in a second netlist. A third netlist is generated for a second version of the system after performing synthesis in a second compilation. A hybrid netlist is formed from the first, second, and third netlist. Incremental placement is performed on portions of the hybrid netlist that are new to the first compilation. Optimizations are performed on the first version of the system during routing in the first compilation resulting in a fourth netlist. A fifth netlist is generated for a second version of the system after performing incremental placement on portions of the hybrid netlist. A second hybrid netlist is generated from the second netlist, fourth netlist, and second hybrid netlist. Incremental routing is performed on portions of the second hybrid netlist that are new to the first compilation.

According to an aspect of the present invention, incremental placement is performed by utilizing placement solutions generated from a first compilation of a first version of the system for unchanged components for a second version of the system. A timing area is generated that identifies resources at locations on the target device that can be used for placement of a component in the second version of the system that is new to or changed from the first version of the system. A location for placement of the component is sought by starting at a center of mass in the timing area. Placement on an entire netlist for the second version of the system if the location for placement cannot be found for the component.

According to an aspect of the present invention, incremental routing is performed by generating a routing constraints file that identifies routing solutions that use routing resources from a first version of the system that are used to connect components from the first version of the system that are unchanged in a second version of the system. Routing solutions in the routing constraint file that restrict flexibility are discarded. The routing constraint file is utilized to generate routing solutions for unchanged signals from the second version of the system. Routing solutions are sought for signals from the second version of the system which have no routing solution from the routing constraint file. A signal that was previously routed utilizing the routing constraint file is re-routed if a routing resource assigned to the signal is requested by one or more of the routing signals from the second version of the system a predetermined number of times.

BRIEF DESCRIPTION OF DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Target devices such as field programmable gate arrays (FPGAs), application specific integrated circuits (ASICs), and structured ASICs are used to implement large systems that may include millions of gates and megabits of embedded memory. According to an embodiment of the present invention, an electronic design automation (EDA) tool is used to address the complexity of a large system to create and optimize a design for the system onto physical target devices.

Figure 1:
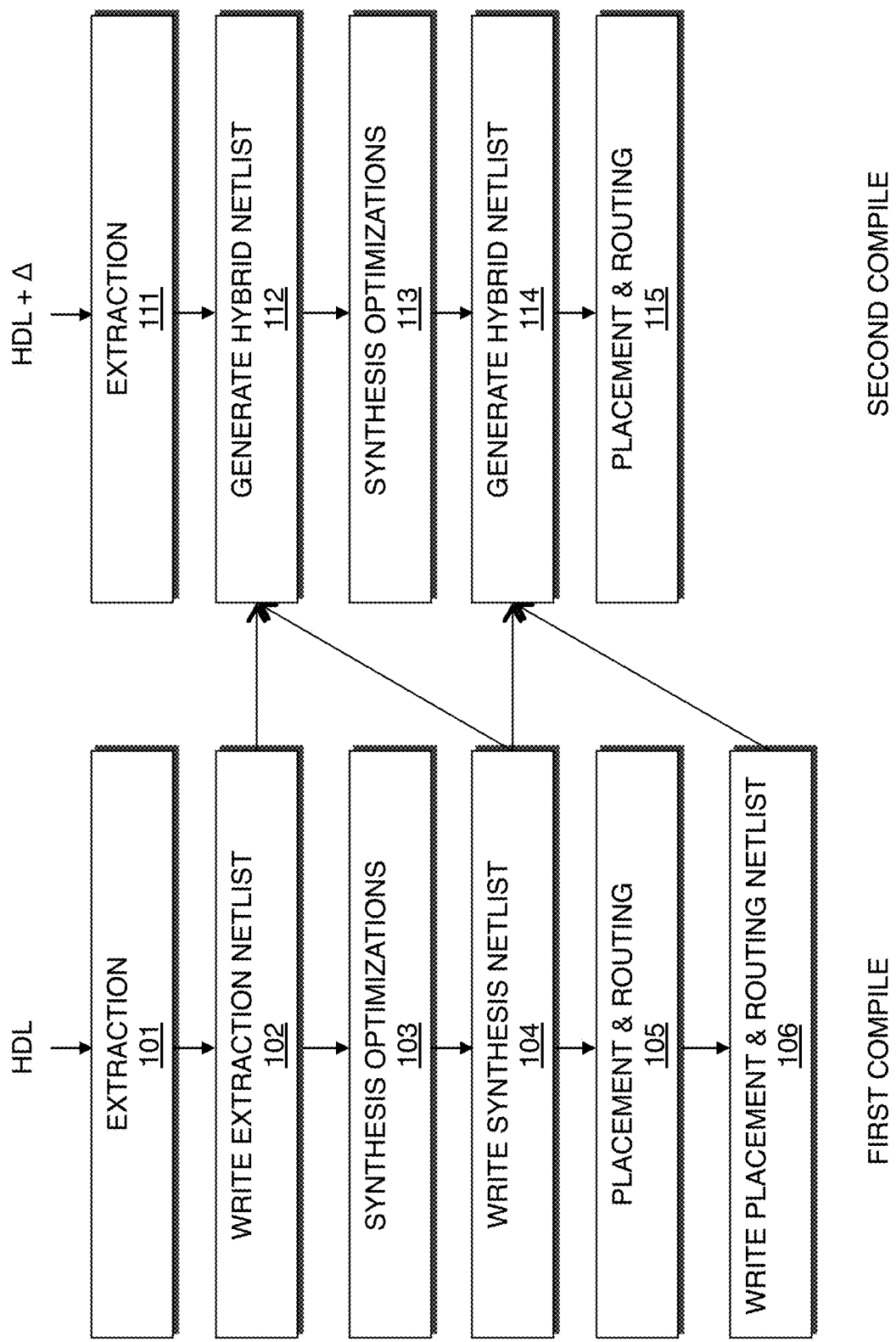
FIG. 1 is a flow chart illustrating a method for designing a system on a target device according to a first exemplary embodiment of the present invention.

FIG. 1 is a flow chart illustrating a method for designing a system on a target device according to an exemplary embodiment of the present invention. The target device may be an FPGA, ASIC, a structured ASIC, or other device. According to one embodiment, the procedure illustrated in FIG. 1 may be performed by a computer aided design (CAD)/EDA tool implemented on a computer system. Procedures 101-106 describe a first compilation of a first or an initial design for a system. At 101, extraction, a first stage of synthesis, is performed on a first design of the system to create an initial structural representation of the system. According to an embodiment of the present invention, extraction includes generating a logical representation of the system from a high level description (HDL) of the system. The high level description of the system may be in the form of schematics, VHDL, Verilog or other design definition. The logical representation may include a representation that includes structural components such as functional blocks and registers ("components"), such as logic gates and logic elements, required for the system. According to an embodiment of the present invention, initial optimizations may also be performed during extraction. These initial optimizations may include the cleanout of netlists and constant propagation. An extraction netlist is created during extraction.

At 102, the extraction netlist created is written into storage.

At 103, synthesis optimizations are performed on the extraction netlist. Synthesis optimizations include generating a logic design of the system to be implemented by the target device. According to an embodiment of the present invention, synthesis optimization generates a logical representation of the system from an HDL design definition. Synthesis optimization also includes mapping the logic design. Mapping includes determining how to implement logic gates and logic elements in the logic representation with specific resources on the target device. According to an embodiment of the present invention, synthesis optimizations operate to reduce the area required for the system and to improve the speed of the system. The synthesis optimizations may include performing procedures such as high level logic synthesis of adders, multiplexers and state machines, lower level multi level synthesis optimizations that operate on combinational gates and registers, and technology mapping to create a netlist of blocks that are supported by the resources available on the target device. It should be appreciated that the lower level multi level synthesis optimizations may include sequential synthesis transformations such as register retiming, duplication, and merging. A synthesis optimizations netlist is created during synthesis optimizations. The optimization performed on the extraction netlist creates optimized synthesized regions.

At 104, the synthesis optimizations netlist is written to storage.

At 105, components in the mapped logical system design are placed and routed. Placement works on the synthesis optimizations netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device. According to an embodiment of the present invention, clustering is performed at an early stage of placement and occurs directly after synthesis during the placement preparation stage.

During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 106, placement and routing solutions as well as timing data derived from the placement and routing of the first design of the system are written to storage. According to an embodiment of the present invention, the placement and routing solutions may include physical information such as coordinates of placed components, specific routing wires used to implement connections for signals, clock network selection, and routing of clock and control signals.

Procedures 111-115 describe a subsequent or second design for a system in a second compilation. In this second design, changes are made to the HDL compiled by the first compilation. The changes may be made by a designer or other system design tool. At 111, extraction is performed on the second design of the system to create an initial structural representation of the system. According to an embodiment of the present invention, the second design of the system includes one or more changes to the first design of the system. The extraction procedure at 111 may be similar to the extraction procedure described with reference to procedure 101. An extraction netlist is created during extraction.

At 112, a first hybrid netlist is generated for the second design of the system. According to an embodiment of the present invention, the first hybrid netlist is generated from the extraction netlist generated from the first compilation at 102, the synthesis netlist generated from the first compilation at 104, and the extraction netlist generated from the second compilation at 111. According to an embodiment of the present invention, a differentiation procedure is performed between the extraction netlist for the first design created from the first compilation at 101 and the extraction netlist for the second design created from the second compilation at 111. The differentiation procedure identifies equivalent nodes in the subsequent compilation. Equivalent nodes in the extraction netlist from the second compilation are replaced with synthesis optimization implementations from the first compilation to form the hybrid netlist.

At 113, optimizations are performed on regions in the extraction netlist that have changed. The optimizations performed reduce area and improve speed of the system. The synthesis optimizations procedure at 113 may be similar to the synthesis optimizations procedure described with reference to procedure 103. The optimization performed on the first hybrid netlist generates a synthesis netlist for the second design.

At 114, a second hybrid netlist is generated for the second design of the system. According to an embodiment of the present invention, the second hybrid netlist is generated from the synthesis netlist generated from the first compilation at 104, the placement and routing netlist generated from the first compilation at 106, and the synthesis netlist generated from the second compilation at 113. According to an embodiment of the present invention, a differentiation procedure is performed between the synthesis netlist for the first design created from the first compilation at 103 and the synthesis netlist for the second design created from the second compilation at 113. The differentiation procedure identifies equivalent nodes in the subsequent compilation. Equivalent nodes in the synthesis netlist from the second compilation are replaced with placement and routing implementations generated at procedure 105 from the first compilation to form the hybrid netlist.

At 115, placement and routing is performed. According to an embodiment of the present invention, placement and routing is performed utilizing the placement and routing solutions generated from 105 for regions of the second design of the system that are identical to the first design of the system. Changed regions in the second design for the system are placed utilizing the procedures described with reference to procedure 105.

FIG. 1 illustrates an embodiment of the present invention where hybrid netlists are generated at two instances of the second compilation in order to leverage solutions generated during a first compilation for a first design to accelerate compilation of a second design during a second compilation. It should be appreciated that hybrid netlists may be generated at other instances of the second compilation as well.

Figure 2:
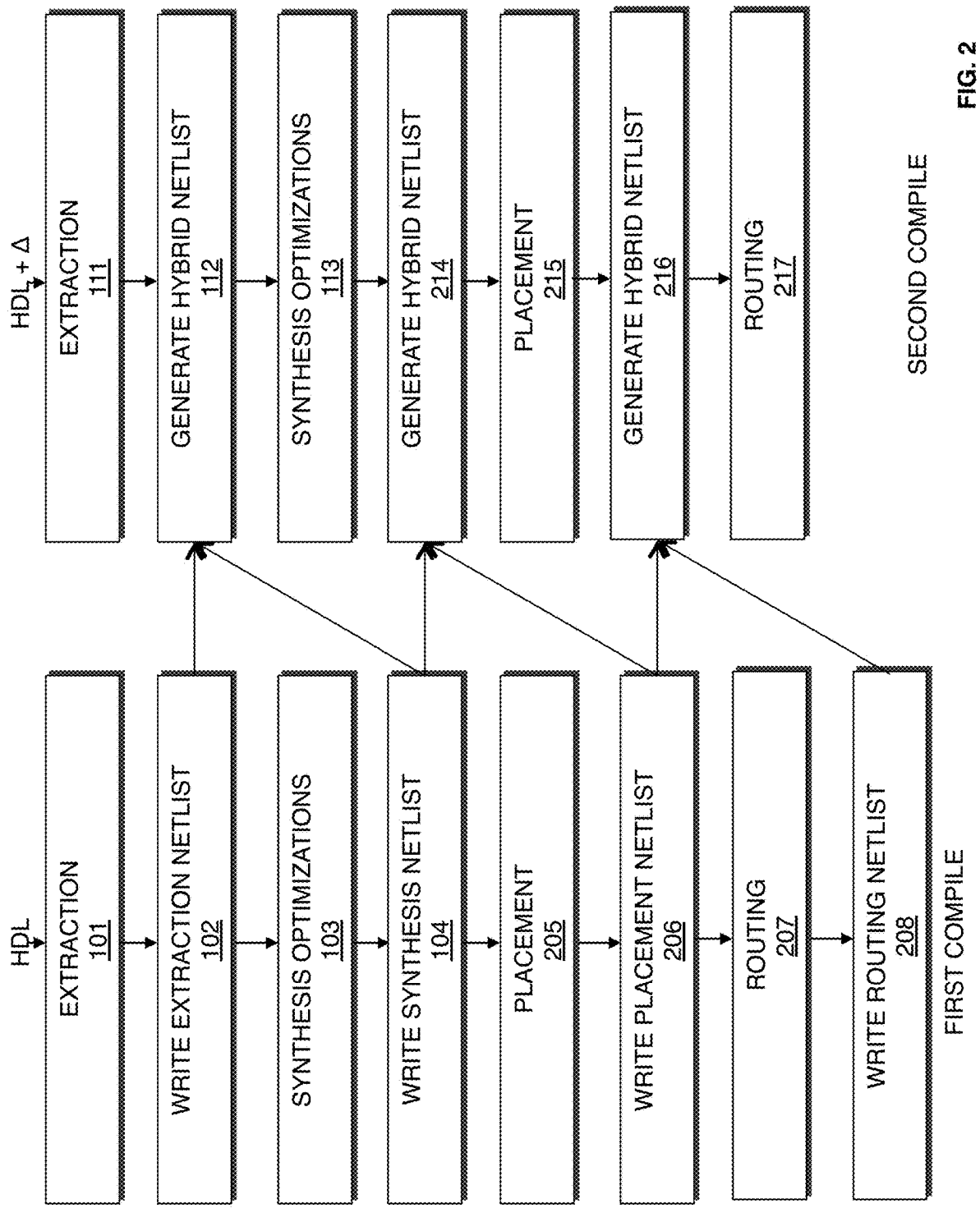
FIG. 2 is a flow chart illustrating a method for designing a system on a target device according to a second exemplary embodiment of the present invention.

FIG. 2 is a flow chart illustrating a method for designing a system on a target device according to a second exemplary embodiment of the present invention. Similarly to the embodiment illustrated in FIG. 1, procedures 101-104 of the first compilation generate a synthesis netlist for a first design, and procedures 111-113 generates a first hybrid netlist that leverages the synthesis optimizations of the first system for similar components in the second design, and performs incremental synthesis on the new or changed components in the second design.

Instead of writing a combined placement and routing netlist during the first compilation that is used to generate a second hybrid netlist, the embodiment illustrated in FIG. 2 performs placement at 205 and writes only a placement netlist at 206. Subsequently, routing is performed at 207, and a routing netlist is written 208.

At 214, a second hybrid netlist is generated for the second design of the system. According to an embodiment of the present invention, the second hybrid netlist is generated from the synthesis netlist generated from the first compilation at 104, the placement netlist generated from the first compilation at 206, and the synthesis netlist generated from the second compilation at 113. According to an embodiment of the present invention, a differentiation procedure is performed between the synthesis netlist for the first design created from the first compilation at 103 and the synthesis netlist for the second design created from the second compilation at 113. The differentiation procedure identifies equivalent nodes in the subsequent compilation. Equivalent nodes in the synthesis netlist from the second compilation are replaced with placement implementations generated at procedure 205 from the first compilation to form the hybrid netlist.

At 215, placement is performed. According to an embodiment of the present invention, incremental placement is performed utilizing the placement solutions generated from 205 for regions of the second design of the system that are identical to the first design of the system. Changed regions in the second design for the system are placed utilizing the procedures described with reference to procedure 105/205.

At 216, a third hybrid netlist is generated for the second design of the system. According to an embodiment of the present invention, the third hybrid netlist is generated from the placement netlist generated from the first compilation at 206, the placement netlist generated from the first compilation at 216, and the routing netlist generated from the second compilation at 208. According to an embodiment of the present invention, a differentiation procedure is performed between the placement netlist for the first design created from the first compilation at 206 and the placement netlist for the second design created from the second compilation at 216. The differentiation procedure identifies equivalently placed nodes in the subsequent compilation. Routes for signals between equivalently placed nodes in the routing netlist from the first compilation are utilized to form the hybrid netlist.

At 217, routing is performed. According to an embodiment of the present invention, routing solutions generated from 207 are utilized for signals between equivalently placed nodes in the routing netlist in the second design. Changed regions in the second design for the system are routed utilizing the procedures described with reference to procedure 106/207.

It should be appreciated that an assembly procedure may be performed after placement and routing 105/207 and/or incremental placement and routing 115/217. The assembly procedure involves creating a data file that includes information determined by the compilation procedure described. The data file may be a bit stream that may be used to program a target device. According to an embodiment of the present invention, the procedures illustrated in FIGS. 1 and 2 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. The target device may be programmed with the data file. By programming the target with the data file, components on the target device are physically transformed to implement the system.

FIG. 1 illustrates an embodiment of the present invention where hybrid netlists are generated prior to synthesis of a second compilation utilizing information for a synthesis netlist of the first compilation, and prior to placement and routing of the second compilation utilizing information from a placement and routing netlist from the first compilation. FIG. 2 illustrates an embodiment of the present invention where hybrid netlists are generated prior to synthesis, prior to placement, and prior to routing of a second compilation utilizing information from a synthesis netlist, placement netlist, and routing netlist of the first compilation. It should be appreciated that in an alternate embodiment a single hybrid netlist may be generated during a second compilation prior to synthesis, wherein the hybrid netlist utilizes information from synthesis, placement, and routing of a first compilation.

Figure 3:
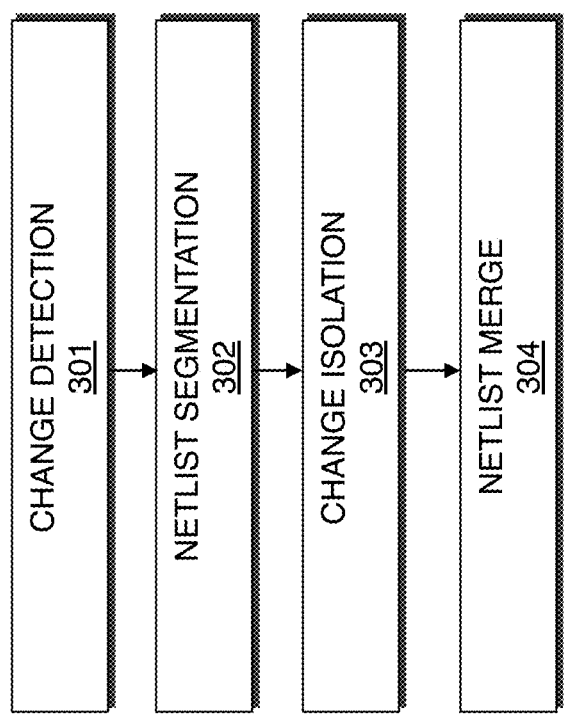
FIG. 3 is a flow chart illustrating a method for generating a hybrid netlist according to an exemplary embodiment of the present invention.

FIG. 3 is a flow chart illustrating a method for generating a hybrid netlist according to an exemplary embodiment of the present invention. One or more of the procedures illustrated in FIG. 3 may be used in part to implement procedures 112, 114, 214, and 216 in FIGS. 1 and 2. According to an embodiment of the present invention, a previous input netlist $P_{in}$, a previous output netlist $P_{out}$, and a current input netlist $C_{in}$ are received. With respect to procedure 112 at FIG. 1, the extraction netlist from the first compilation would be $P_{in}$, the synthesis netlist from the first compilation would be $P_{out}$, and the extraction netlist from the second compilation would be $C_{in}$. With respect to procedure 114 at FIG. 1, the synthesis netlist from the first compilation would be $P_{in}$, the placement and routing netlist from the first compilation would be $P_{out}$, and the synthesis netlist from the second compilation would be $C_{in}$.

At 301, change detection is performed on a previous input netlist $P_{in}$ and a current input netlist $C_{in}$. According to an embodiment of the present invention, change detection may be performed by performing name matching where the names of nodes in a previous input netlist $P_{in}$ are compared with names of nodes in a current input netlist $C_{in}$. An unmatched name in the current input netlist $C_{in}$ may represent a change in the netlist. According to an embodiment of the present invention, change detection may also be performed by comparing connectivity of nodes to determine if an input port is connected differently, fanouts of the node, names of drivers, or other parameters related to the nodes. Changed and added nodes are marked on an outputted current input netlist $C_{in}$. According to an embodiment of the present invention, unchanged nodes may be referred to as "locked nodes" and change or added nodes may be referred to as "unlocked nodes".

At 302, netlist segmentation is performed. According to an embodiment of the present invention, netlist segmentation involves assigning functionally invariant boundaries (FIBs) to the previous input netlist $P_{in}$, previous output netlist $P_{out}$, and current input netlist $C_{in}$. Given two or more netlists, FIBs are boundaries in the netlists that are known to have equivalent functionality in all netlists considered. These boundaries could be netlist nodes or netlist connections. When directly comparing an input netlist with an output netlist, FIBs have the property of being nodes or connections that have the same observable functionality both before and after optimization. According to one aspect of the invention, optimizations are performed between the FIBs and not across them. The FIBs can be registers, input output pins, carry chains, digital signal processors, memories, look up tables, or other components. According to an embodiment of the present invention, all the nodes in an extraction netlist are initially designated as FIBs. When performing optimizations during synthesis, placement, and/or routing, the set of FIBs identified may be updated. According to an embodiment of the present invention, when optimizations are performed on or across a FIB, that FIB is invalidated. Also, when a group of FIBs are technology mapped to a resource on the target device, all of the FIBs in the group with the exception of the FIB closest to the output are invalidated. During netlist segmentation, previous input netlist $P_{in}$, previous output netlist $P_{out}$, and current input netlist $C_{in}$ are validated against each other.

At 303, change isolation is performed. According to an embodiment of the present invention, change isolation involves identifying segmentations, derived from 302, corresponding to changed and unchanged nodes, derived at 301.

At 304, a netlist merge is performed to form a hybrid netlist. According to an embodiment of the present invention, the hybrid netlist includes segmentations from the previous output netlist $P_{out}$ that correspond to unchanged nodes, and segmentations from the current input netlist $C_{in}$ that correspond to changed nodes.

Figure 4:
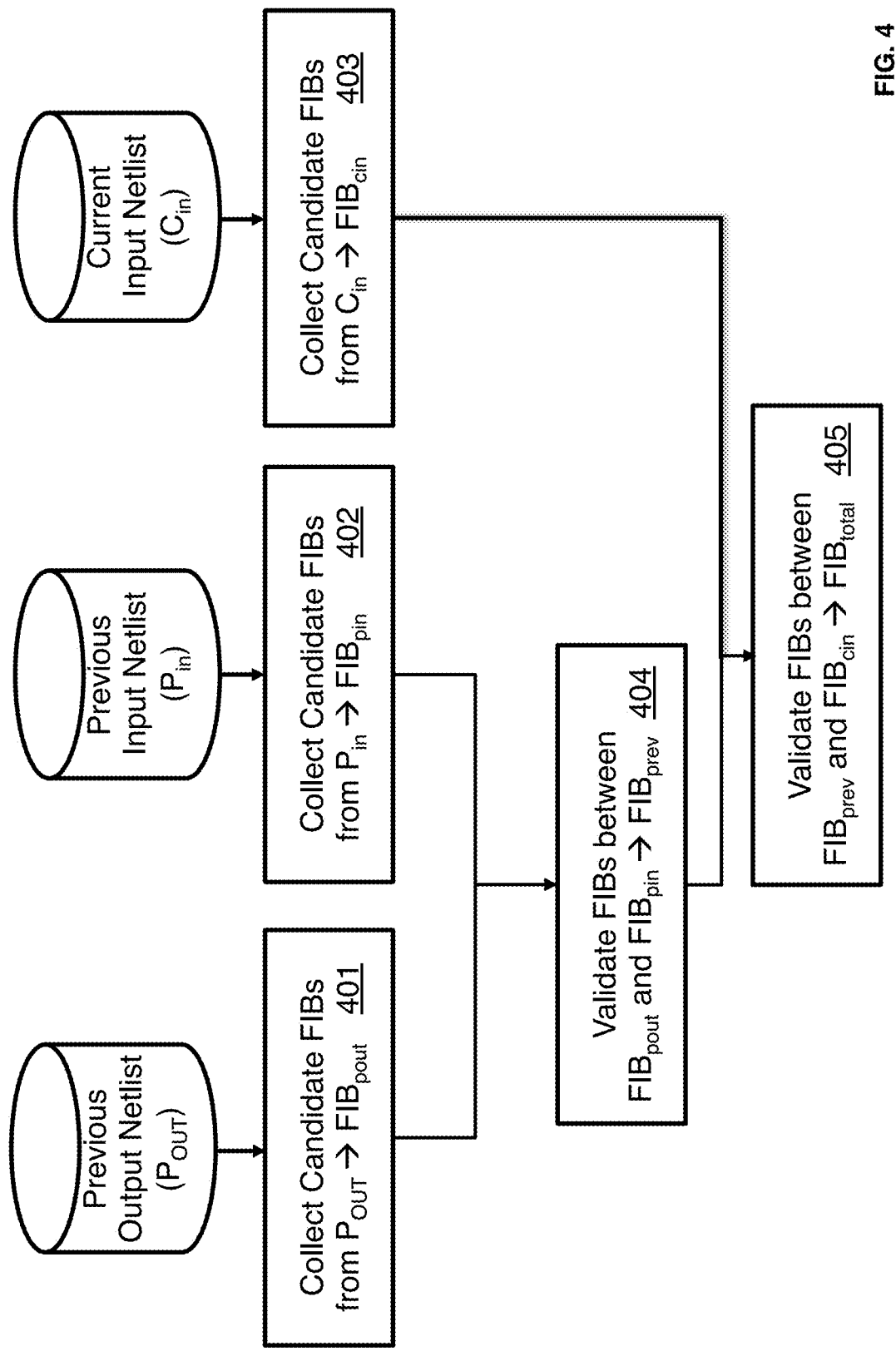
FIG. 4 is a flow chart illustrating a method for performing netlist segmentation according to an embodiment of the present invention.

FIG. 4 is a flow chart illustrating a method for performing netlist segmentation according to an embodiment of the present invention. The procedure illustrated in FIG. 4 may be used to implement procedure 302 illustrated in FIG. 3. At 401, candidate FIBs are collected from a previous output netlist $P_{out}$ to form a FIB netlist, $FIB_{pout}$. At 402, candidate FIBs are collected from a previous input netlist $P_{in}$ to form a FIB netlist, $FIB_{pin}$. At 403, candidate FIBs are collected from a current input netlist $C_{in}$ to form a FIB netlist, $FIB_{cin}$.

According to an embodiment of the present invention, FIB collection involves identifying boundaries in a netlist that could be functionally invariant when comparing two netlists. For a boundary to be functionally invariant both before and after a compilation optimization, the observable functionality must not be modified at the boundary during the compilation optimization. Any node input or output could be a candidate to be functionally invariant after optimization. According to one embodiment, a sub-set of connection types may be considered to reduce runtime.

At 404, the FIBs between the FIB netlist for the previous output netlist and the FIB netlist for the previous input netlist are validated to form a previous FIB netlist, $FIB_{prev}$. According to an embodiment of the present invention. FIB validation involves verifying which of the candidate FIBs discovered by FIB collection can actually be considered a FIB after optimization. At 404, validation of FIBs between the $P_{out}$ and $P_{in}$ netlists is performed. Candidate FIBs are compared between the $P_{out}$ and $P_{in}$ netlists and any FIB candidates that cannot be matched by name in these two sets are discarded. In one embodiment, nodes and signals are renamed when their functionalities are altered by optimization. FIB candidates in the remaining list may be further scrutinized to determine if they are truly functionally invariant. This may include structural netlist comparison techniques, simulation and/or other forms of formal verification.

At 405, the FIBs between the previous FIB netlist and the FIB netlist for the current input netlist are validated to form a total FIB netlist, $FIB_{total}$. According to an embodiment of the present invention, the FIB candidates in the $C_{in}$ netlist are matched with the FIBs validated at 404. As described with reference to 404, name matching may be performed. Matching FIBs are designated to be validated in all three netlists.

Figure 5:
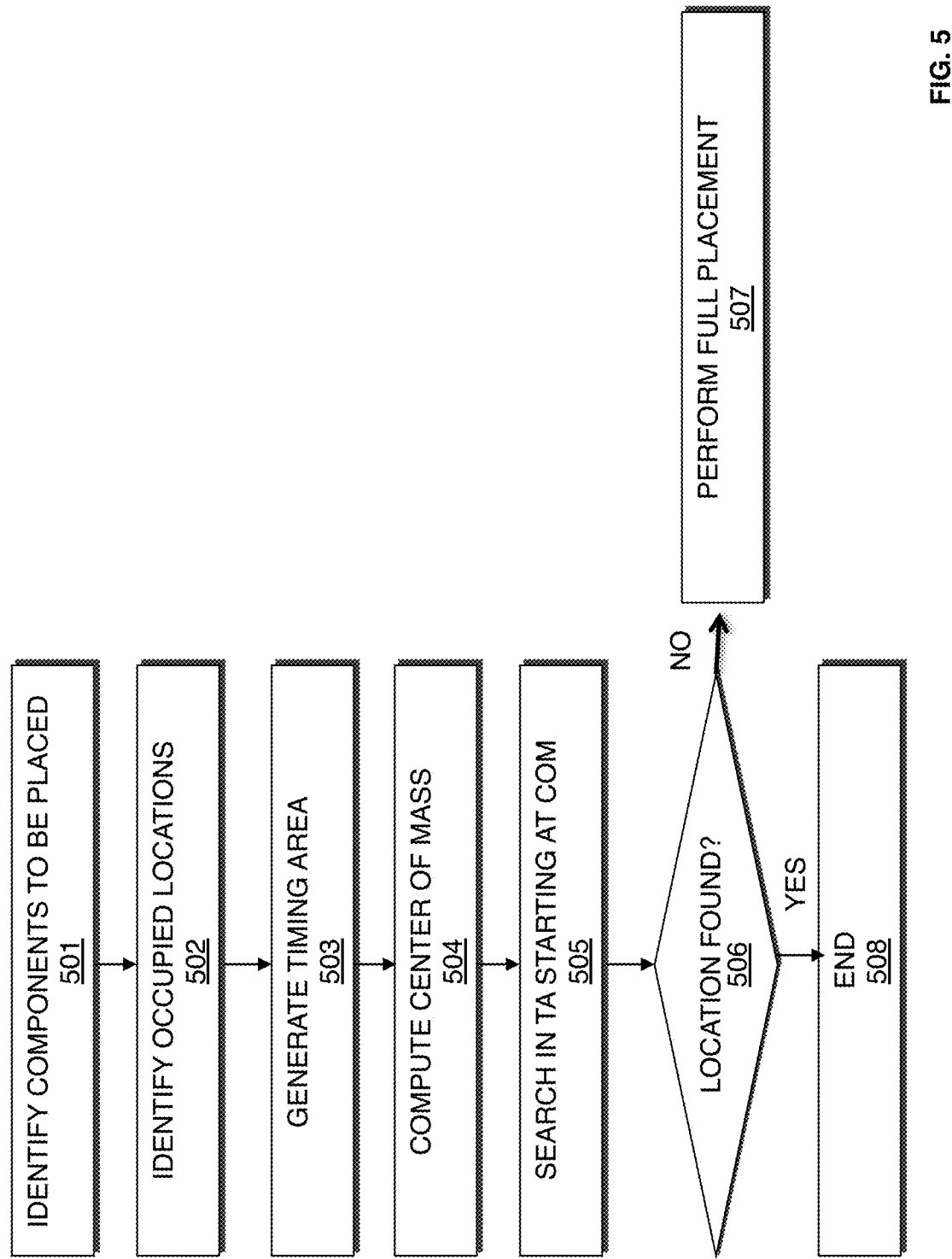
FIG. 5 is a flow chart illustrating a method for performing incremental placement according to an embodiment of the present invention.

FIG. 5 is a flow chart illustrating a method for performing incremental placement according to an embodiment of the present invention. The procedure illustrated in FIG. 5 may be used to implement procedure 115 and 215 in FIGS. 1 and 2 in part. Incremental placement may be performed on a hybrid netlist. At 501, components to be placed are identified from the hybrid netlist. According to an embodiment of the present invention, components associated with the segmentations from current input netlist $C_{in}$ are identified to be placed. The components to be placed may be referred to as "unlocked nodes". According to an embodiment of the present invention, if it is determined that too many components are required to be incrementally placed at 501 due to there being a number of components associated with the segmentations from current input netlist $C_{in}$ that exceed a predetermined number, control may proceed to 507 so that a full placement should be performed in lieu of proceeding through procedures 502-506.

At 502, occupied locations on a target device are identified. According to an embodiment of the present invention, locations and resources on the target device associated with segmentations from previous output netlist from $P_{out}$ are identified to be occupied locations.

At 503, a timing area is generated for each component to be placed. The timing area represents a restricted search space for placement of the component. Components placed outside the timing area are presumed to fail timing requirements of the system.

At 504, a center of mass is computed for each component to be placed within its corresponding timing area. According to an embodiment of the present invention, the center of mass is based on timing-weighted connections to placed or locked components. In this embodiment, placed sources of signals input to the component and placed destinations of signals output from the component are used to determine a location in the timing area to designated as the center of mass.

At 505, a location for placement of the component is searched for in the timing area. The search begins at the center of mass and propagates outward to locate an unoccupied location. According to an embodiment of the present invention, the search direction may propagate in a spiral. It should be appreciated that various other searching algorithms may be used.

At 506, it is determined whether a location is found for the components. If a location is not found for all the components to be placed, control proceeds to 507. If a location is found for the components to be placed, control proceeds to 508 and terminates the procedures.

At 507, control terminates incremental placement and performs full placement on the hybrid netlist. According to an alternate embodiment of the present invention, control may undo the placement of a subset of unchanged or locked components before or instead of performing full placement on the hybrid netlist. Control may initially undo the placement of a small subset of unchanged or locked nodes and gradually undo a larger subset if placement continues to be unsuccessful.

It should be appreciated that procedures 503-506 may be implemented in a loop where each component identified at 501 is incrementally placed one at a time. In this embodiment, after a location is found for a component, placement locations may be updated to reflect which locations are occupied to avoid conflicts in assignment.

Figure 6:
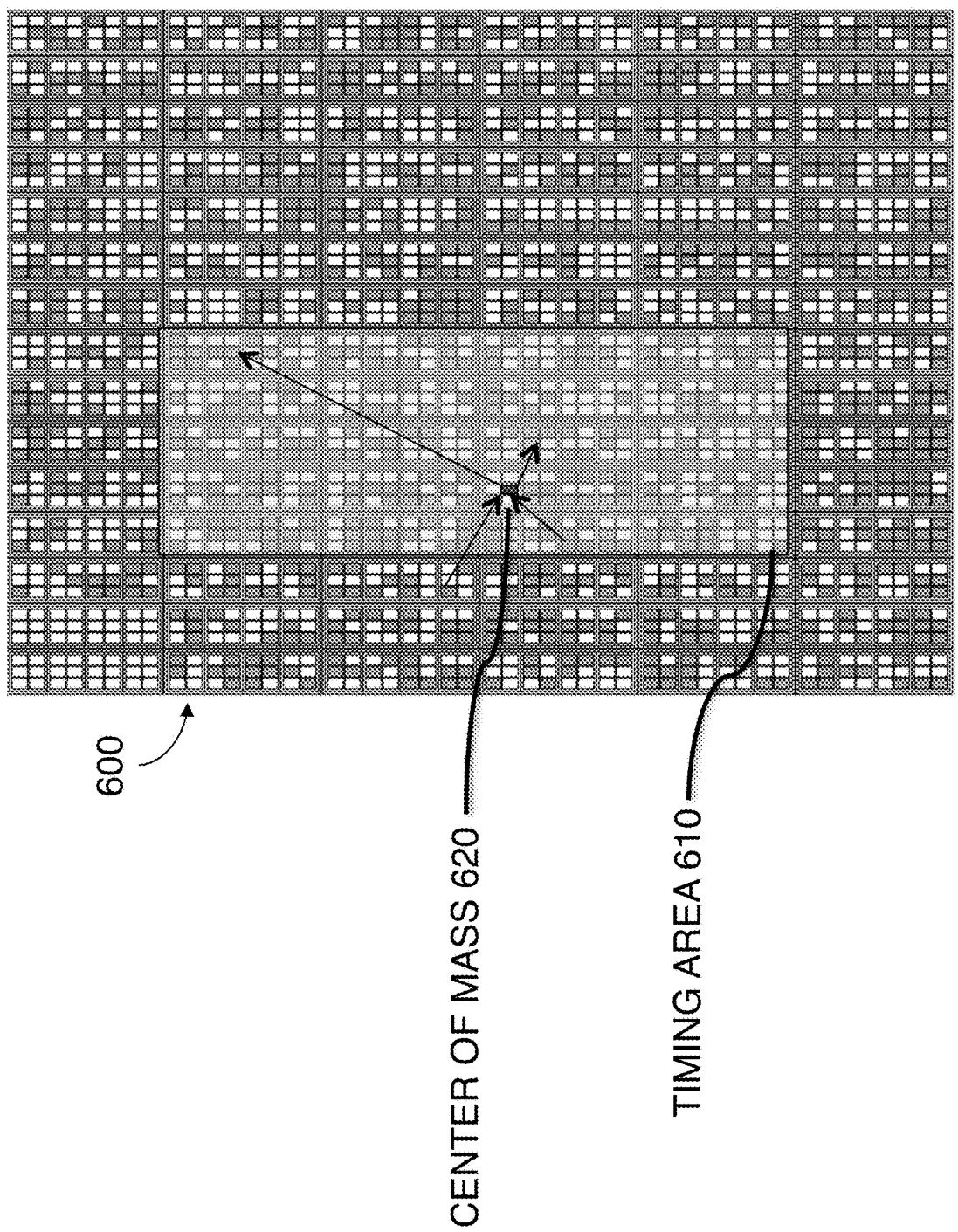
FIG. 6 illustrates an example of a timing area according to an embodiment of the present invention.

FIG. 6 illustrates an example of a timing area 610 according to an embodiment of the present invention. Timing area 610 resides on a portion of a target device 600 that includes a plurality of logic blocks. The logic blocks are represented by small rectangles. The shaded rectangles represent occupied logic blocks that have been assigned to implement locked components in a design. The unshaded rectangles represent unoccupied logic blocks that may be assigned to unlocked components. Center of mass 620 represents a starting location for placement of a component within the timing area 610.

Figure 7:
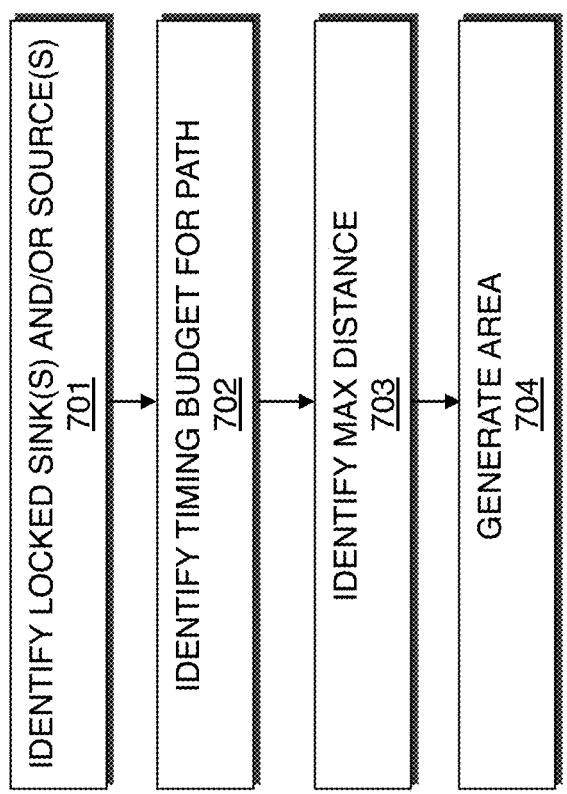
FIG. 7 is a flow chart illustrating a method for generating a timing area according to an embodiment of the present invention.

FIG. 7 is a flow chart illustrating a method for generating a timing area according to an embodiment of the present invention. The timing area is generated based on the concept that given a free or unlocked node connected to a locked node, a maximum distance may be computed between the two nodes where if the free node is placed beyond the maximum distance, the timing path corresponding to the nodes is guaranteed to fail timing. This concept may be extended to produce regions involving multi-hop timing paths. The procedure illustrated in FIG. 7 may be used to implement procedure 503 in FIG. 5. At 701, for each signal through a node to be placed, identify a locked sink or source.

At 702, a timing budget for a routing path for each of the signal is identified. According to an embodiment of the present invention, all routing delays are assumed to be zero in computing the timing budget. If a locked sink/source is assigned to a region instead of a coordinate location, the outermost corners of the region may be used to compute the timing budget.

At 703, a maximum distance is identified in each direction from each identified locked sink and/or source. According to an embodiment of the present invention, the maximum distance is computed using information specific to the target device used for placement.

At 704, a timing area is generated from the maximum distances for each of the identified locked sink and/or source. According to an embodiment of the present invention, the intersection of each of the maximum distances is used to form the timing area.

Figure 8:
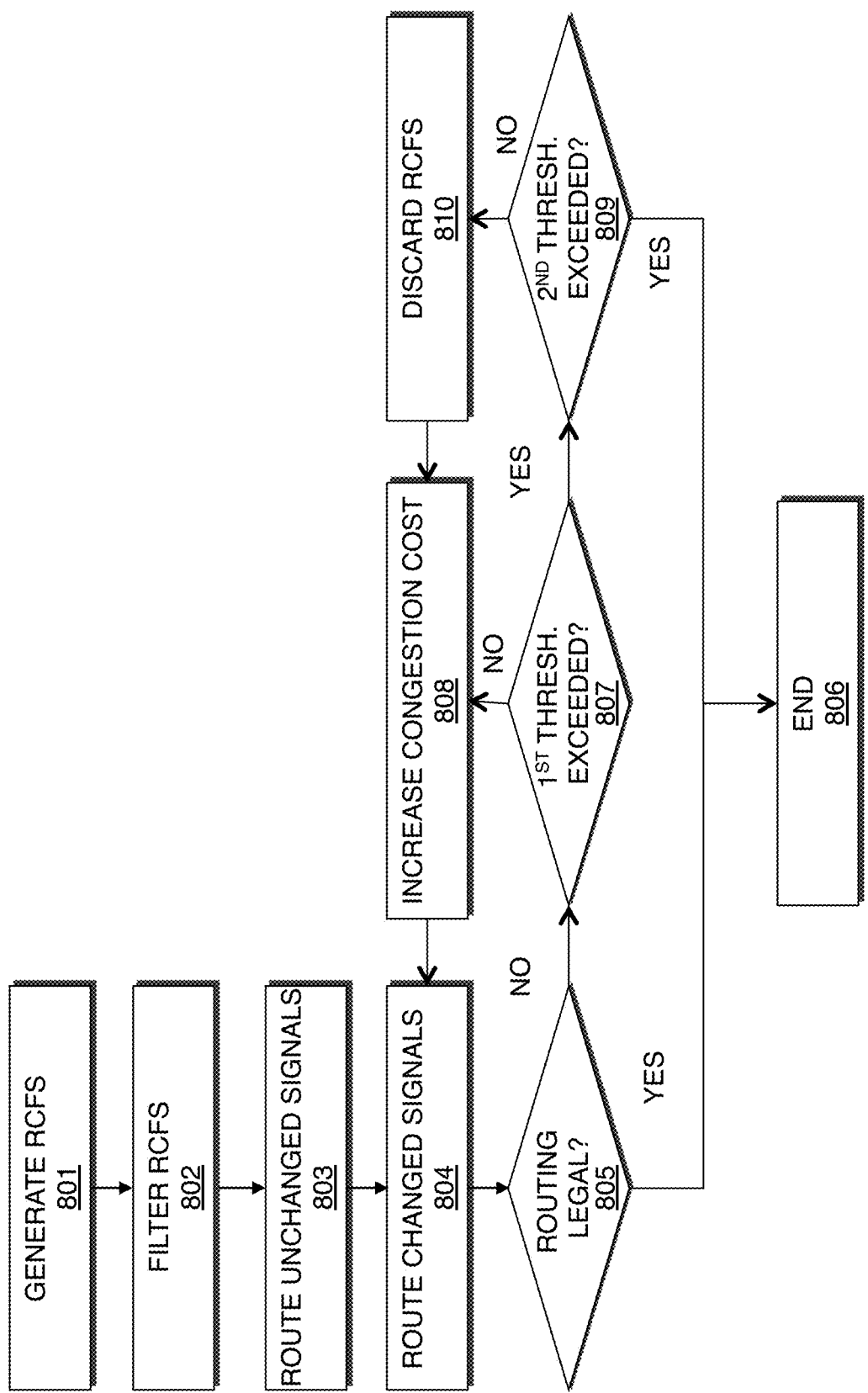
FIG. 8 is a flow chart illustrating a method for performing incremental routing according to an embodiment of the present invention.

FIG. 8 is a flow chart illustrating a method for performing routing according to an embodiment of the present invention. The procedure illustrated in FIG. 8 may be used to implement procedure 115 and 217 in FIGS. 1 and 2 in part.

At 801 routing constraint files (RCFs) are generated. According to an embodiment of the present invention, routing constrain files include information from a hybrid netlist that reflect routing solutions for signals from a previous compilation of a first design that are unchanged in a second design.

At 802, the routing constraint files are filtered to improve flexibility in routing signals. According to an embodiment of the present invention, routing constraint files associated with a component having unconstrained input routing or unconstrained external fanout are discarded. Routing constraint files associated with a component that is unlocked because it is new or has changed in the second design may also be discarded. It should be appreciated that other criteria may be used to filter routing constraint files.

At 803, routing is performed on unchanged signals or nets. Since the signals have not been changed since the first compilation, routing solutions previously generated for the signals that are available in the routing constraint files are utilized to route the signals.

At 804, routing is performed on changed signals or nets. Regular routing is performed for the signals where routing solutions from a previous design are not available or have been discarded. According to an embodiment of the present invention, the routing procedure described with reference to 105 in FIG. 1 may be used to perform routing at 804.

At 805, it is determined whether routing for the signals is legal. If routing for the signals is legal, control proceeds to 806 where the procedures are terminated because routing has been accomplished. If routing for the signals is not legal, control proceeds to 807.

At 807, it is determined whether a number of iterations performed for routing the signals has exceeded a first threshold value. If the number of iterations performed for routing has not exceeded the first threshold, control proceeds to 808. If the number of iterations performed for routing has exceeded the first threshold, control proceeds to 809.

At 808, a congestion cost in a cost function used in routing the signals is increased. According to an embodiment of the present invention, increasing the congestion cost results in having a router avoid assigning a routing resource to more than one signal. Control proceeds to 804 where routing of the signals is attempted again.

At 809, it is determined whether the number of iterations performed for routing the signals has exceeded a second threshold value. If the number of iterations performed for routing has not exceeded a second threshold, control proceeds to 810. If the number of iterations performed for routing has exceed the second threshold, control proceeds to 806 where the procedures are terminated because routing cannot be accomplished.

At 810, some of the routing constraints are discarded. According to an embodiment of the present invention, the routing solutions from the hybrid netlist used for routing some of the unchanged signals at 803 are discarded. Specifically, if after several routing iterations, the algorithm detects congestion on the routing resources occupied by an unchanged signal, the routing constraint will be discarded. Subsequent iterations of the routing algorithm will now freely route the unchanged connection using different paths. The process of discarding routing constraints for unchanged signals may repeat multiple times before the routing algorithm completes. Congestion cost is increased at 808, and full routing is performed at 804 where all the signals in the second design are re-routed.

FIGS. 1-5, and 7-8 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 9:
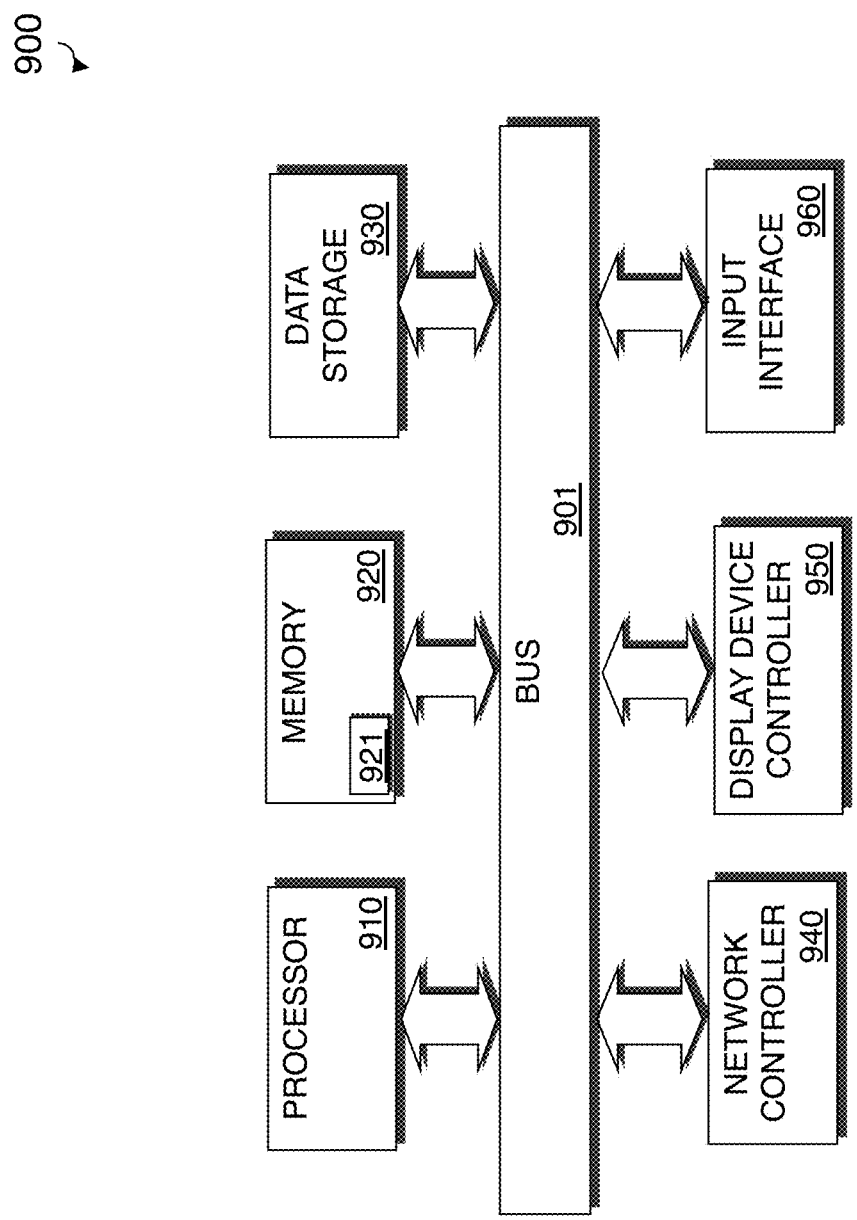
FIG. 9 illustrates a block diagram of a computer system implementing a system designer according to an embodiment of the present invention.

FIG. 9 is a block diagram of an exemplary computer system 900 in which an example embodiment of the present invention resides. The computer system 900 includes a processor 910 that process data signals. The processor 910 is coupled to a bus 901 or other switch fabric that transmits data signals between processor 910 and other components in the computer system 900. The computer system 900 includes a memory 920. The memory 920 may store instructions and code represented by data signals that may be executed by the processor 910. A data storage device 930 is also coupled to the bus 901

A network controller 940 is coupled to the bus 901. The network controller 940 may link the computer system 900 to a network of computers (not shown) and supports communication among the machines. A display device controller 950 is coupled to the bus 901. The display device controller 950 allows coupling of a display device (not shown) to the computer system 900 and acts as an interface between the display device and the computer system 900. An input interface 960 is coupled to the bus 901. The input interface 960 allows coupling of an input device (not shown) to the computer system 900 and transmits data signals from the input device to the computer system 900.

A system designer 921 may reside in the memory 920 and be executed by the processor 910. According to an embodiment of the present invention, the system designer 921 generates a first netlist for a first version of a system after performing synthesis in a first compilation. Optimizations are performed on the first version of the system during placement and routing in the first compilation resulting in a second netlist. A third netlist is generated for a second version of the system after performing synthesis in a second compilation. A hybrid netlist is generated from the first, second, and third netlists. Incremental placement and routing are performed on portions of the hybrid netlist that are new to the first compilation.

Figure 10:
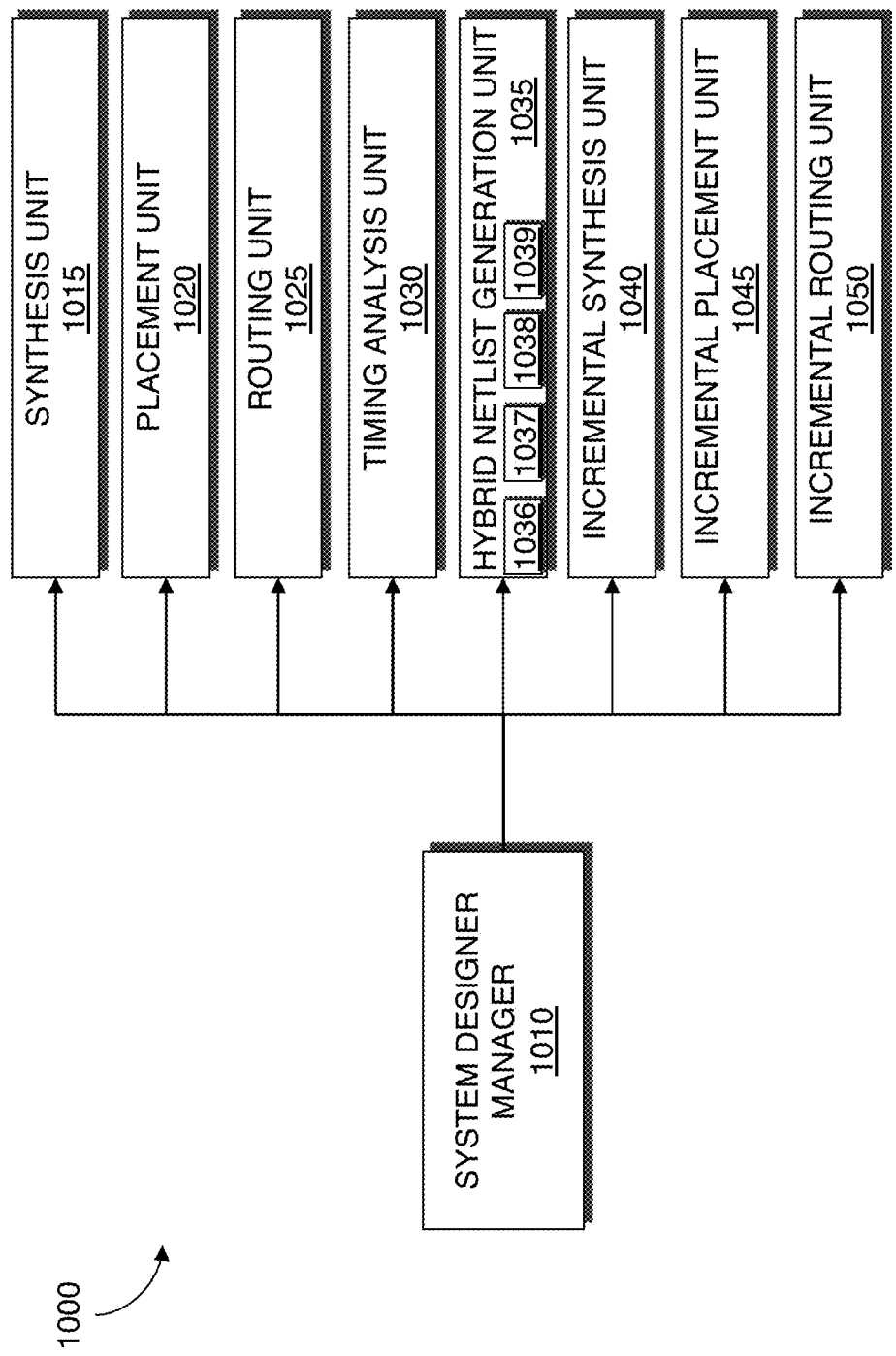
FIG. 10 is a block diagram of a system designer according to an embodiment of the present invention.

FIG. 10 illustrates a system designer 1000 according to an embodiment of the present invention. The system designer 1000 may be used to implement the system designer 921 described with reference to FIG. 9. The system designer 1000 may be an EDA tool for designing a system on a target device such as an FPGA, ASIC, structured ASIC, or other circuitry. FIG. 10 illustrates modules implementing an embodiment of the system designer 1000. According to one embodiment, the modules represent software modules and system design may be performed by a computer system such as the one illustrated in FIG. 10 executing sequences of instructions represented by the modules shown in FIG. 10. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1000 includes a designer manager 1010. The system designer manager 1010 is connected to and transmits data between the other components of the system designer 1000. The system designer manager 1010 provides an interface that allows a user to input data into the system designer 1000 and that allows the system designer 1000 to output data to the user.

The system designer 1000 includes a synthesis unit 1015. The synthesis unit 1015 generates a logic design of the system to be implemented by the target device. According to an embodiment of the present invention, the synthesis unit 1015 generates an optimized logical representation of the system from the HDL design definition and maps the optimized logic design. According to an embodiment of the present invention, a synthesis netlist is generated from mapping. This synthesis netlist may be an optimized technology-mapped netlist generated from the HDL.

The system designer 1000 includes a placement unit 1020. According to an embodiment of the present invention, the placement unit 1020 places the mapped logical system design on the target device. Placement works on the technology-mapped netlist to produce a placement for each of the functional blocks. According to an embodiment of the present invention, placement unit 1020 fits the system on the target device by determining which resources on the logic design are to be used for specific logic elements, and other function blocks determined to implement the system as determined during synthesis. Placement may include clustering which involves grouping logic elements together to form the logic clusters present on the target device. A placement netlist is generated from placement.

The system designer 1000 includes a routing unit 1025 which routes the placed design on the target device. The routing unit 1025 allocates routing resources on the target device to provide interconnections between logic gates, logic elements, and other components on the target device. The routing unit 1025 may also perform routability optimization on the placed logic design. A routing netlist is generated from routing.

The system designer 1000 includes a timing analysis unit 1030 which performs timing analysis on the design of the system generated. According to an embodiment of the present invention, the timing analysis determines whether timing constraints of the system are satisfied. The timing analysis may utilize approximations depending on when it is performed.

The system designer 1000 includes a hybrid netlist generation unit 1035. According to an embodiment of the present invention, the hybrid netlist generation unit 1035 generates a hybrid netlist from a previous input netlist $P_{in}$ from a first design of a system from a previous compilation, a previous output netlist $P_{out}$ from the first design of the system from the previous compilation, and a current input netlist $C_{in}$ from a second design of the system from a current compilation. It should be appreciated that the previous input netlist may be a synthesis netlist or a placement netlist, that the previous output netlist may be a placement netlist, routing netlist, or a combination of a placement and routing netlist, and that the current input netlist may be a synthesis netlist, placement netlist, or routing netlist. The hybrid netlist generation unit includes a change detection unit 1036, a netlist segmentation unit 1037, a change isolation unit 1038, and a netlist merge unit 1039 that performs the functionalities described in procedures 301-304 respectively from FIG. 3.

The system designer 1000 includes an incremental synthesis unit 1040. The incremental synthesis unit 1040 identifies components that require synthesis from the hybrid netlist and performs the functionalities described with reference to procedure 113 in FIG. 1.

The system designer 1000 includes an incremental placement unit 1045. The incremental placement unit 1045 identifies components that requirement placement from the hybrid netlist and performs the functionalities described with reference to FIG. 5.

The system designer 1000 includes an incremental routing unit 1050. The incremental routing unit 1050 identifies signals that requirement routing from the hybrid netlist and performs the functionalities described with reference to FIG. 8.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 11:
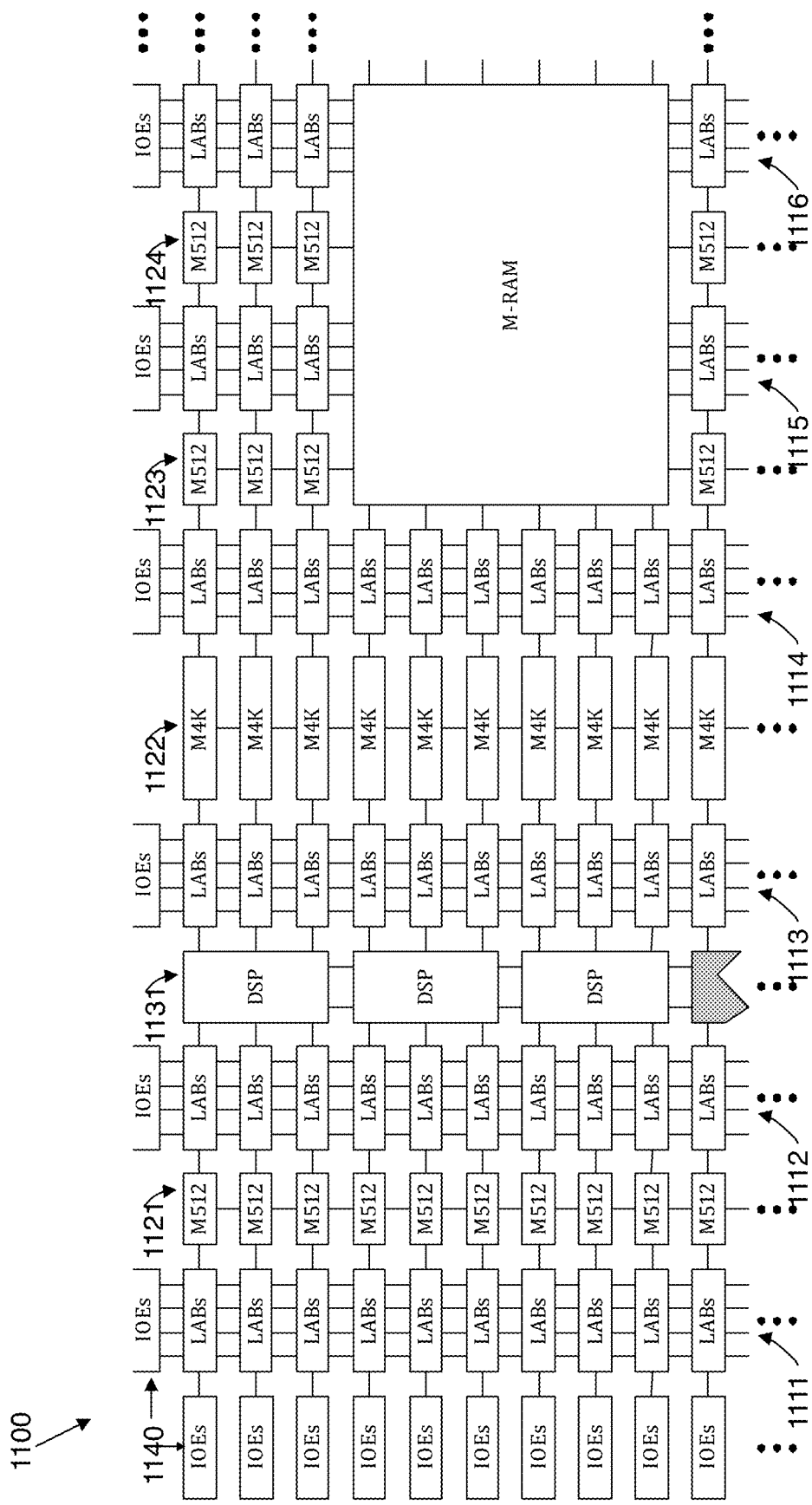
FIG. 11 illustrates an example of a target device according to an embodiment of the present invention.

FIG. 11 illustrates a device 1100 that may be used to implement a target device according to an embodiment of the present invention. The device 1100 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1100. Columns of LABs are shown as 1111-1116. It should be appreciated that the logic block may include additional or alternate components.

The device 1100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1100. Columns of memory blocks are shown as 1121-1124.

The device 1100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1100 and are shown as 1131.

The device 1100 includes a plurality of input/output elements (IOEs) 1140. Each IOE feeds an IO pin (not shown) on the device 1100. The IOEs 1140 are located at the end of LAB rows and columns around the periphery of the device 1100. Each IOE may include a bidirectional IO buffer and a plurality of registers for registering input, output, and output-enable signals.

The device 1100 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A tangible, non-transitory, machine-readable medium, comprising machine-readable instructions to:
    perform physical optimizations on a first reference design to be implemented in programmable logic, saving the physical optimizations to a list; receive one or more designer-specified changes to the first reference design to be included in a second version of the first reference design;
    during a subsequent compile for the second version of the first reference design to be implemented in the programmable logic, reduce a compile time of the subsequent compile, by:
        identifying a subset of the physical optimizations from the list that are relevant to the second version; and
        generating a netlist for the second version of the first reference design, by applying the subset of the physical optimizations from the list to the netlist, wherein the netlist comprises data describing the subset of the physical optimizations; and
    providing the netlist for the second version of the first reference design to the programmable logic for implementation on the programmable logic.

2. The machine-readable medium of claim 1, comprising instructions to:
    identify unmodified nodes between the first reference design and the second version; and
    identify the subset of the physical optimizations on the first reference design that are relevant for the second version based upon the unmodified nodes.

3. The machine-readable medium of claim 2, wherein the netlist comprises additional data describing the unmodified nodes between the first reference design and the second version.

4. The machine-readable medium of claim 2, wherein the netlist comprises additional data describing new nodes between the first reference design and the second version, modified nodes between the first reference design and the second version, or both.

5. The machine-readable medium of claim 1, comprising instructions to: perform the physical optimizations after a placement phase to provide placement for functional blocks of the first reference design.

6. The machine-readable medium of claim 1, comprising instructions to perform the physical optimizations to enhance routing of placed logic of the first reference design.

7. The machine-readable medium of claim 1, comprising instructions to:
    perform a second set of physical optimizations on modified regions of the second version of the first reference design.

8. The machine-readable medium of claim 1, comprising instructions to:
    generate the netlist based upon the list, by:
        reading from the list to identify the subset of physical optimizations; and
        applying the subset of the physical optimizations to the netlist.

* * * * *